United States Patent [19]

Rehrig

[11] Patent Number: 5,441,288
[45] Date of Patent: Aug. 15, 1995

[54] SHOPPING CART AND CHASSIS THEREFOR

[75] Inventor: Houston Rehrig, 8801 Mary Meade Ct., Potomac, Md. 20854

[73] Assignee: Houston Rehrig, Washington, D.C.

[21] Appl. No.: 102,214

[22] Filed: Aug. 5, 1993

[51] Int. Cl.⁶ .............................................. B62B 3/02
[52] U.S. Cl. .......................... 280/33.991; 280/33.992; 220/647
[58] Field of Search ...................... 280/33.991, 33.992, 280/33.994, 33.995, 33.996; 220/647, 648, 650, 651, 652, 653

[56] References Cited

U.S. PATENT DOCUMENTS

| 3,999,774 | 12/1976 | Rehrig | 280/33.99 R |
| 4,046,394 | 9/1977 | Thompson, Jr. | 280/33.99 R |
| 4,273,346 | 6/1981 | Rehrig | 280/33.99 F |
| 4,650,199 | 3/1987 | Rehrig | 280/33.99 S |
| 4,746,134 | 5/1988 | Rehrig | 280/33.99 R |
| 4,865,338 | 9/1989 | Rehrig | 280/33.992 |
| 4,922,639 | 5/1990 | Rehrig | 40/308 |

Primary Examiner—Richard M. Camby
Attorney, Agent, or Firm—Banner & Allegretti, Ltd.

[57] ABSTRACT

A shopping cart has a molded plastic basket and a chassis including a generally U-shaped cart handle tube and a reinforced plastic molded lower support structure. A basket support wire braces the basket against the cart handle tube and lends rigidity and strength to the basket. The support wire has legs that extend within respective channels provided along opposing side segments of an upper peripheral edge portion of the basket, less than the entire lengths of the opposing side segments. Bent end portions of the legs, extending into openings provided in the basket peripheral edge portion, fixedly secure the support wire to the basket. A cross-arm portion of the support wire connects the legs and engages the cart handle tube. Upper leg portions of the cart handle tube extend downwardly along a rear panel of the cart basket. Lower leg portions of the cart handle tube extend along rear edge surfaces of the lower support structure and provide at their ends wheel assembly mounting locations. A pair of metal reinforcing rails extending within a horizontally extending base member of the lower support structure are coupled at rear ends thereof to respective lower leg portions of the cart handle tube, and at opposite ends to a front wheel assembly mounting plate.

28 Claims, 9 Drawing Sheets

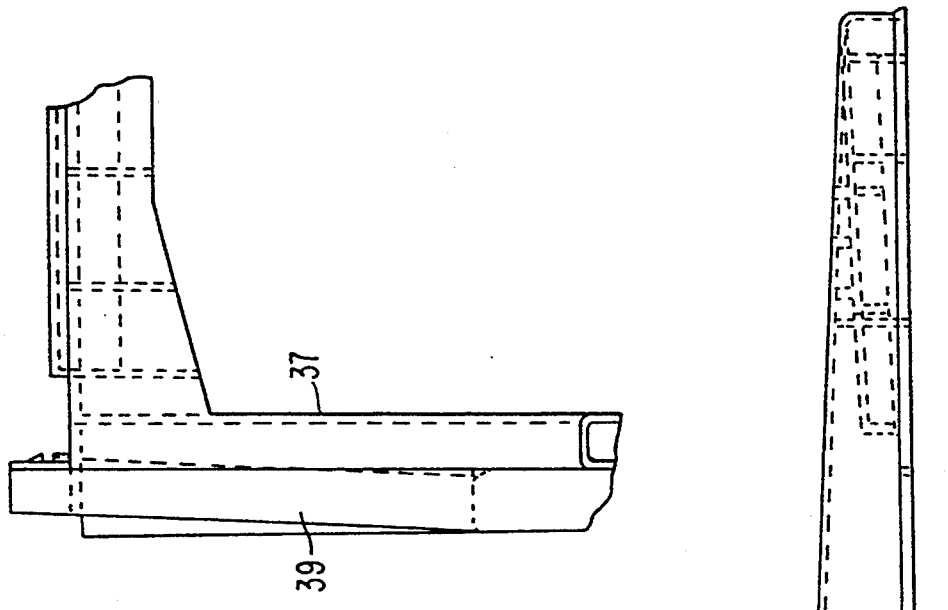
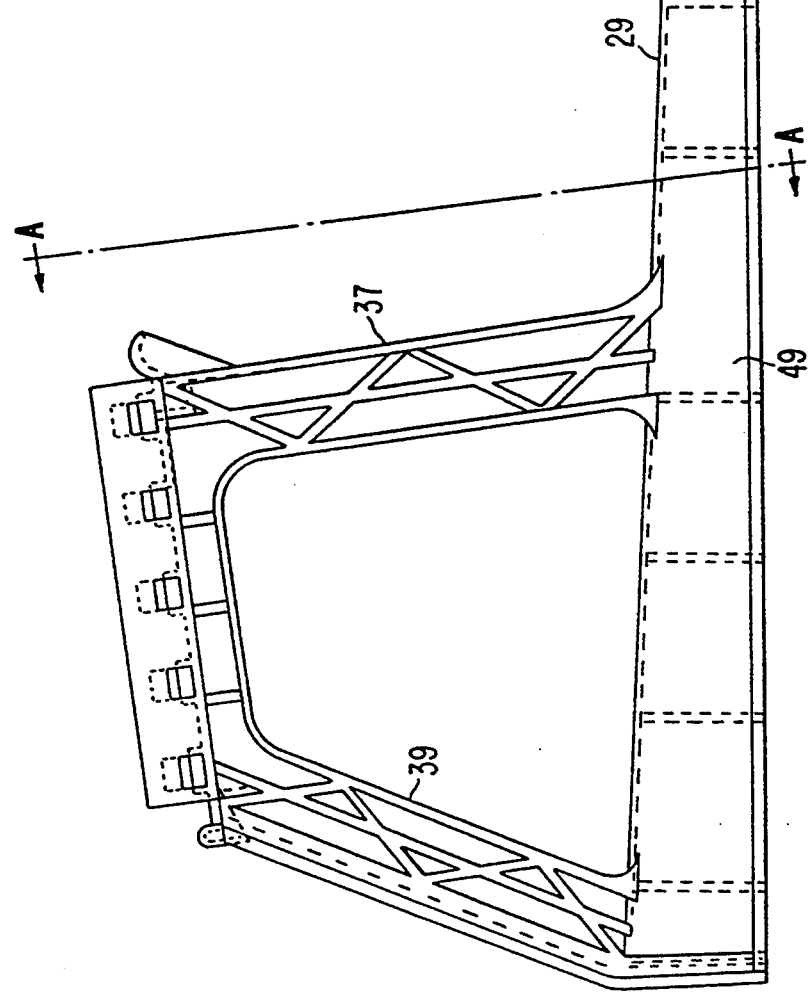

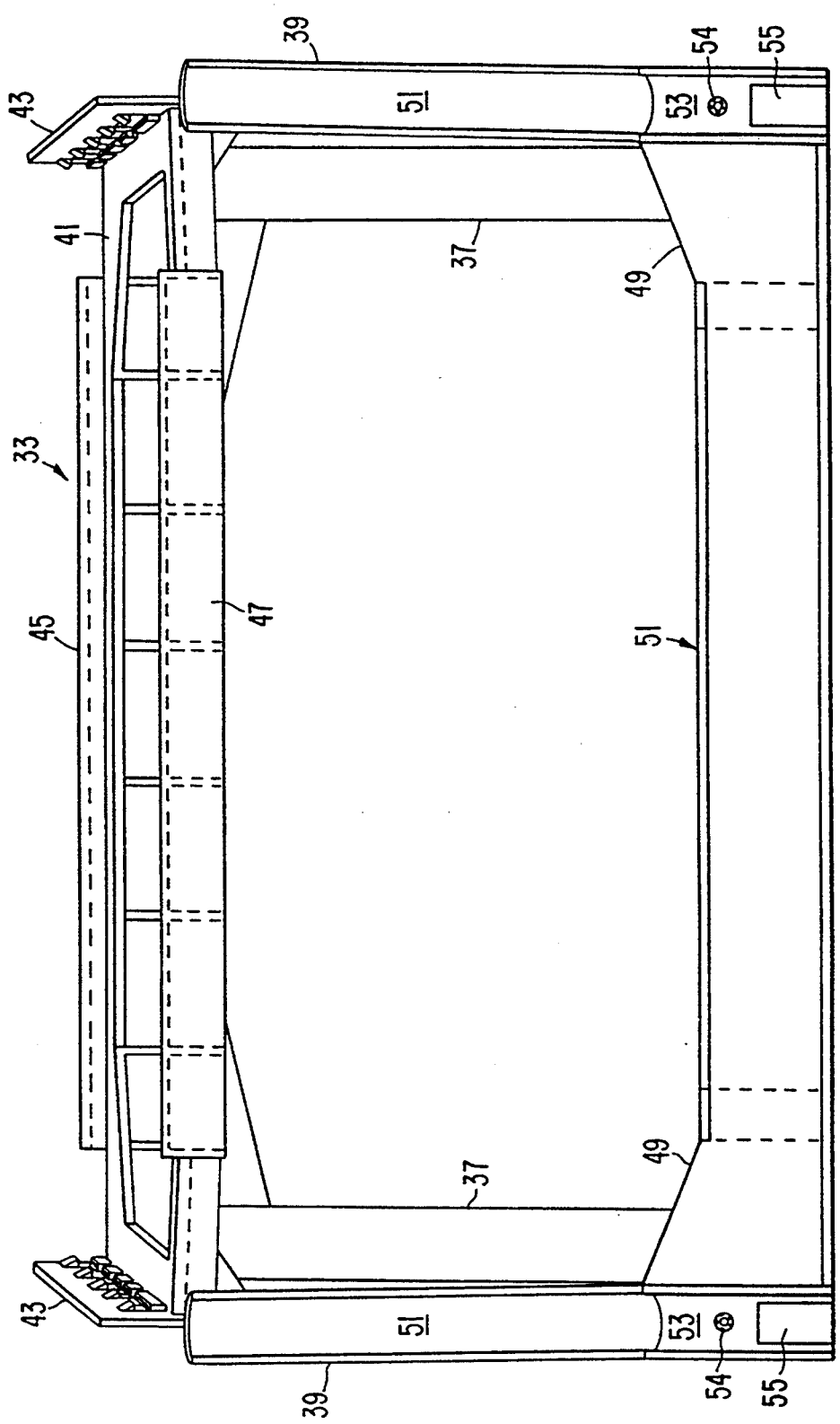

SHOPPING CART AND CHASSIS THEREFOR

BACKGROUND OF THE INVENTION

The present invention relates to shopping carts and the like. In particular, the invention relates to shopping carts of the type having a molded plastic basket and a chassis formed of metal and/or plastic components.

Shopping carts having molded plastic baskets, previously developed by the present inventor, have achieved widespread use and have proved superior to shopping carts with conventional metal wire work baskets. For example, the former are much lighter and have a greater ability to absorb impacts without permanent deformation, and to resist corrosion. Also, they are more easily assembled and taken apart to allow repair or replacement of components since far fewer welded connections are necessary.

A plastic cart design exhibiting the above-described advantages is described in the present inventor's U.S. Pat. No. 3,999,774. In that design, a metal wire reinforcing ring extends around the entire basket opening within a channel provided in an upper peripheral edge of the molded plastic basket side and front panels. A back segment of the wire ring engages the legs of a generally U-shaped cart handle tube provided at the rear of the basket. The cart handle tube legs extend generally vertically along a rear panel of the basket, and are attached at their upper ends by a cross-arm portion providing a cart handle. The lower ends of the cart tubes are attached to a tubular metal base structure carrying front and rear pairs of wheel assemblies.

The inventor's U.S. Pat. No. 4,865,338 discloses an improved reinforcing ring and channel arrangement for the basket of such a plastic cart, or a plastic crate. Therein, specially designed channel protrusions retain the reinforcing ring within a channel without the requirement of channel engaging protrusions on the reinforcing ring.

In carts made in accordance with the above-described patents, the reinforcing ring extends continuously along the entire lengths of the basket side and front panels. Such an arrangement is desirable to lend strength and rigidity to the cart. However, for smaller carts and light-duty applications, a lesser degree of strength and rigidity will suffice, so that such a design may lead to unnecessary material usage for the reinforcing wire. U.S. Pat. No. 4,865,338 recognizes generally that a reinforcing wire may extend about less than the entire periphery of a basket or crate. However, no disclosure is made of how this could be effectively accomplished in connection with a shopping cart, wherein the reinforcing ring braces the basket against the cart handle tube, and is subjected to forces created by downward loads applied to the basket tending to displace the basket relative to the reinforcing ring.

The advantages of a plastic basket construction are taken one step further with the cart designs disclosed in the inventor's U.S. Pat. Nos. 4,746,134 and 4,922,639. In these designs, in place of an all metal frame or chassis, is provided a metal-reinforced plastic chassis. The chassis includes a molded plastic basket support member having a generally horizontally extending base, and an upstanding pedestal structure rising from a rearward portion of the base and providing an elevated basket mounting portion. Cart handle tube legs extend along a rear panel of the basket and terminate at the basket mounting portion. Specially designed wheel mounting brackets are attached to corresponding mounting portions of the plastic base. Conventional caster housings cannot be utilized with these designs and the interchangability of parts among carts is thereby reduced. Furthermore, the mounting brackets required by these designs are more costly to manufacture, chrome plate, and assemble than conventional caster housings.

SUMMARY OF THE INVENTION

In view of the foregoing, it is an object of the present invention to provide a shopping cart having the advantages of a molded plastic construction, and adequate strength and rigidity, yet which is less costly to manufacture, assemble and repair than carts made in accordance with the teachings of the above-described patents.

A further object of the invention is to provide a shopping cart designed such that it can be shipped knocked down, and easily assembled at its destination by the user.

These and other objects are achieved by the present invention which, in a first aspect, provides a cart having a basket provided with a molded plastic upper peripheral edge portion. A cart handle tube has generally vertically extending legs engaging the basket, and a cross-arm portion connecting the legs and providing a cart handle. A basket support wire has legs extending along and secured to respective side segments of the upper peripheral edge portion, along less than the respective lengths of the side segments, and a cross-arm portion connecting the legs and engaging the cart handle tube. A basket support structure is attached to an underside of the basket.

In another aspect, the invention provides the following cart construction. The cart basket has a molded plastic upper peripheral edge portion. A cart handle tube has generally vertically extending legs engaging the basket, and a cross-arm portion connected between the legs and providing a cart handle. A basket support wire has legs extending along the upper peripheral edge portion and has end portions anchored thereto, and a cross-arm portion engaging the cart handle tube. A basket support structure is attached to an underside of the basket.

In still another aspect, the invention provides a cart chassis for supporting a cart basket. Therein, a cart handle tube has generally vertically extending legs and a cross-arm portion connected between the legs for providing a cart handle. The vertically extending legs have respective upper portions for extending along and engaging a cart basket, and respective lower portions for extending below the cart basket. A molded plastic basket support member has a generally horizontally extending base member, and an upstanding pedestal structure rising from a rearward portion of the base member and providing an elevated basket mounting portion. The lower portions of the handle tube legs extend along a rearward side of the pedestal structure and have end portions adjacent a rearward edge of the base member for providing rear wheel assembly mounting locations.

The above and other objects and features of the present invention will become apparent and fully understood from the following detailed description of the preferred embodiment, taken in connection with the appended drawings.

BRIEF DESCRIPTION OF THE DRAWINGS

FIG. 4 is a side elevational view of a lower basket support structure of the present invention.

FIG. 5 is a partial cross-sectional view taken on line A—A of FIG. 4.

FIG. 6 is a rear end view of the lower basket support structure shown in FIG. 4.

DETAILED DESCRIPTION OF THE PREFERRED EMBODIMENT

Figure 1:
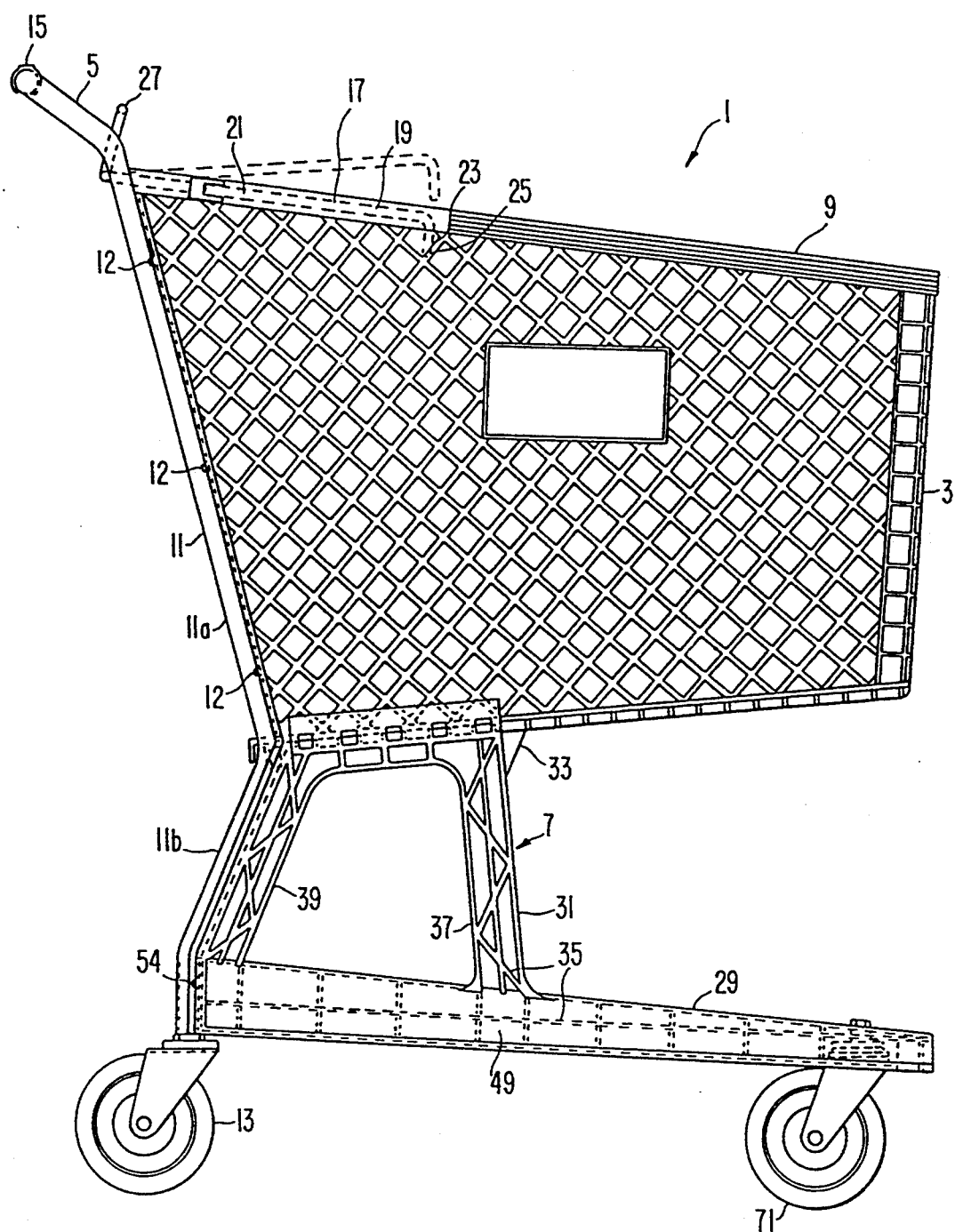
FIG. 1 is a side elevational view of a shopping cart in accordance with the present invention.
Figure 2:
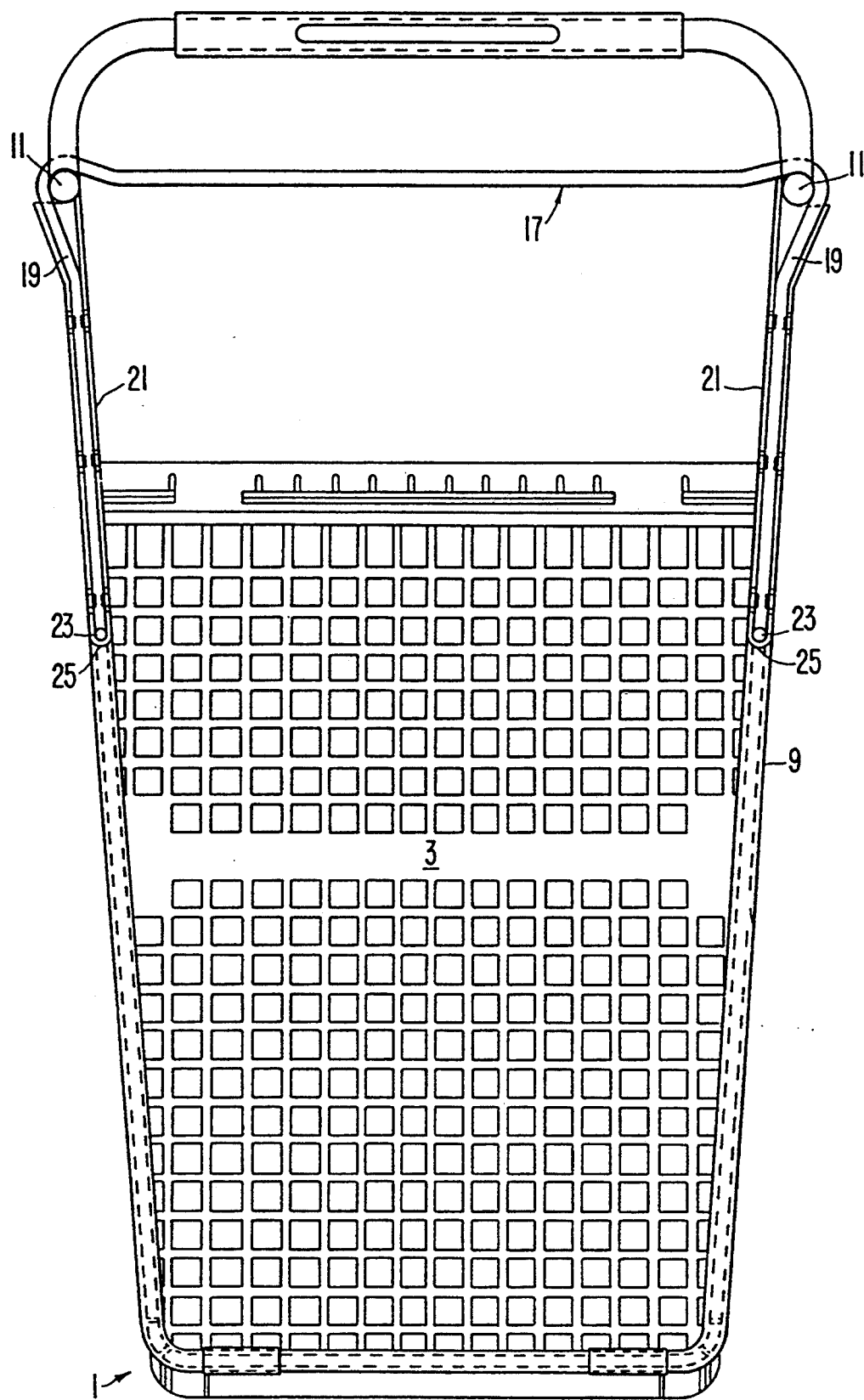
FIG. 2 is a top plan view of the shopping cart shown in FIG. 1.
Figure 3:
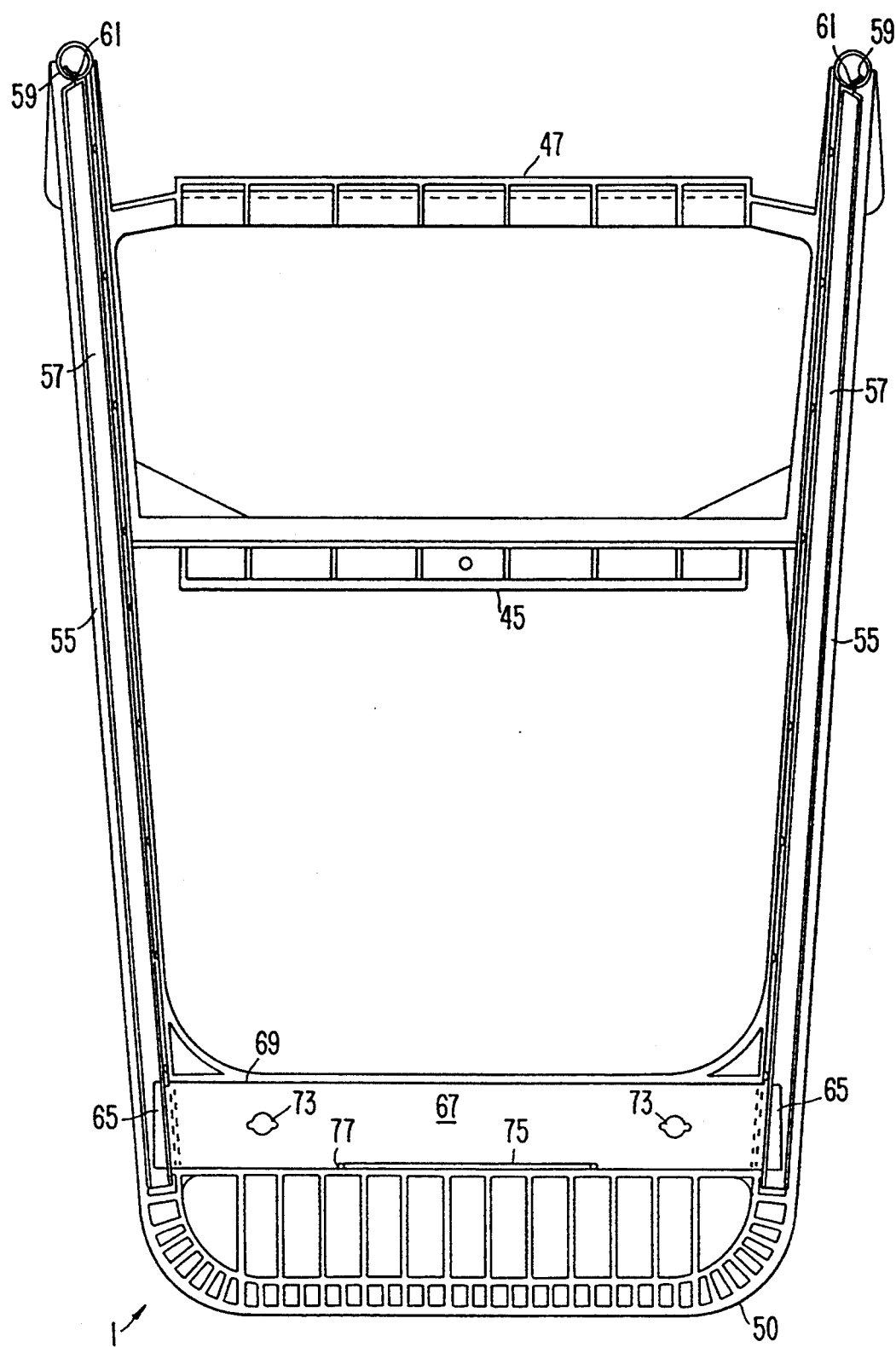
FIG. 3 is a bottom plan view of the shopping cart shown in FIG. 1.
Figure 7:
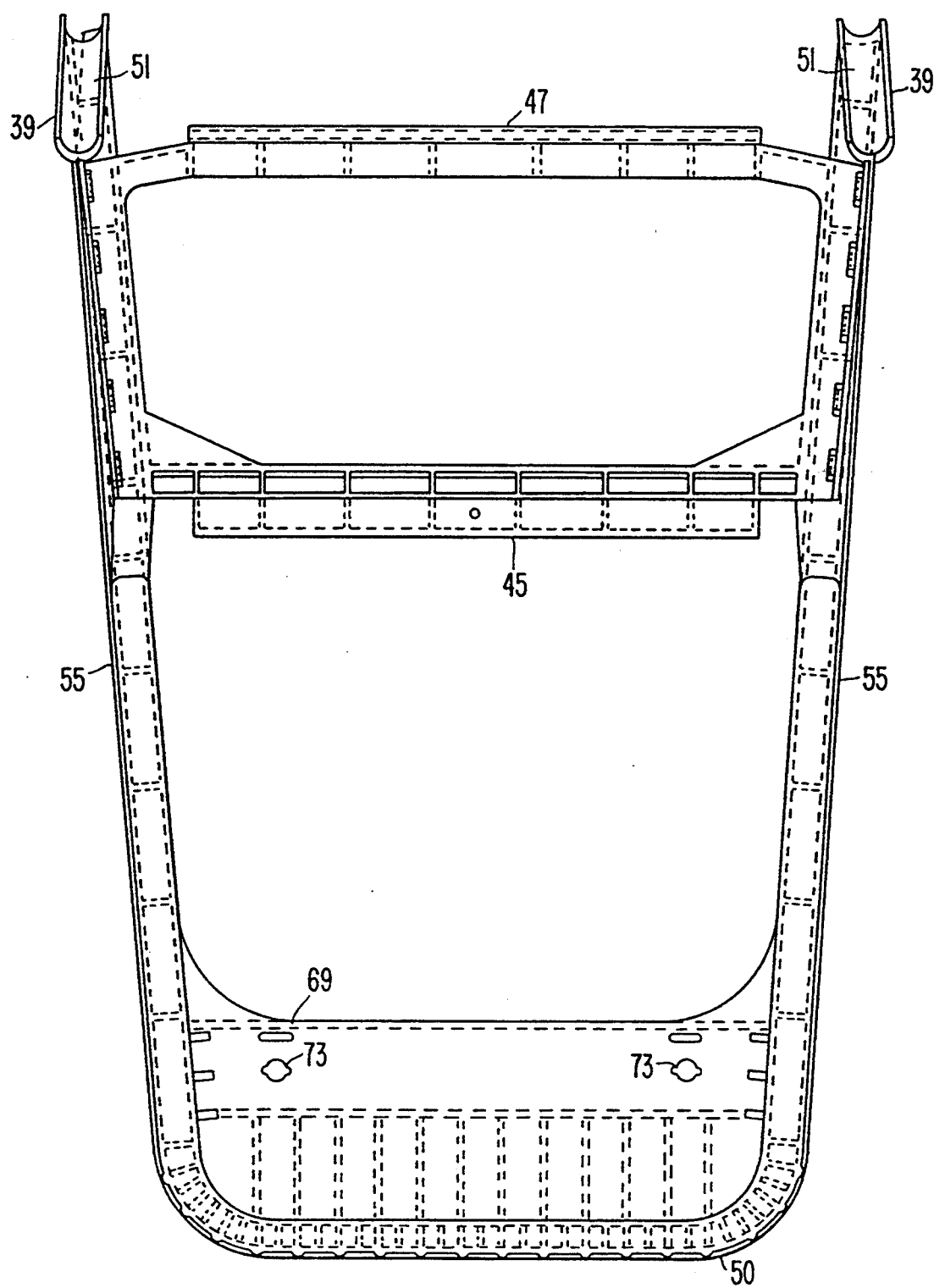
FIG. 7 is a top plan view of the lower basket support structure shown in FIG. 4.
Figure 8:
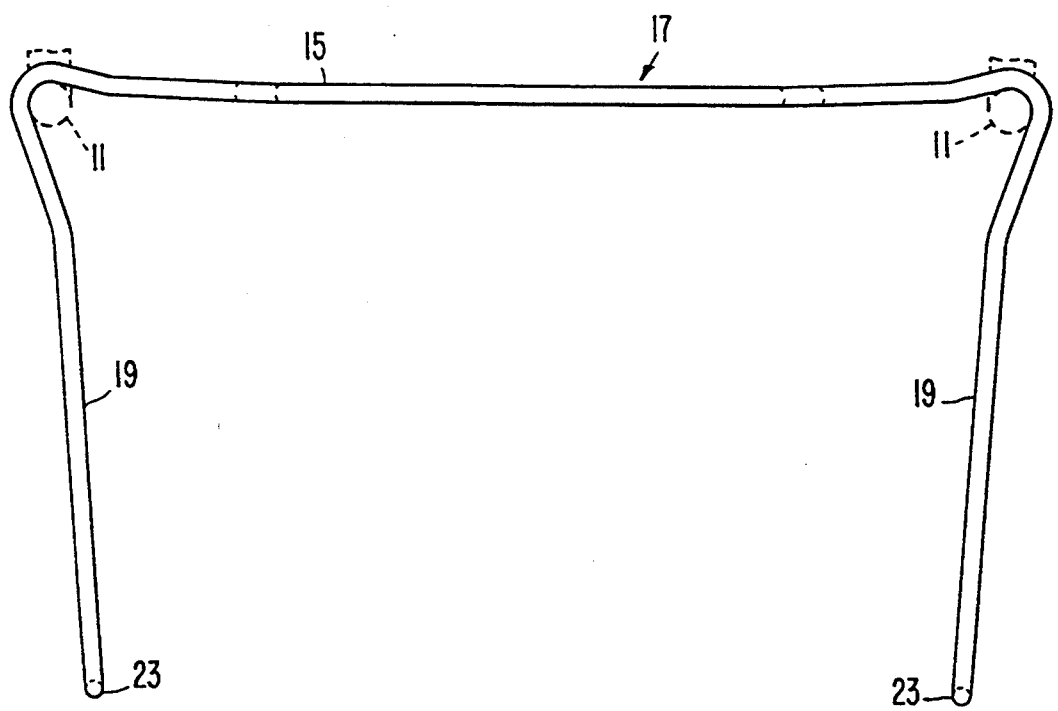
FIG. 8 is a top plan view of a basket support wire of the present invention.

A cart in accordance with the present invention is depicted generally by 1 in FIGS. 1–3. The cart comprises a basket 3 and a chassis comprising a generally U-shaped cart handle tube 5 and a lower basket support structure 7. Basket 3 has a generally open plastic molded lattice work construction. Preferably, the side, front and bottom panels are integrally molded as one piece. Extending about the periphery of the top basket opening, along the side and front panels, is a molded edge portion 9.

Cart handle tube 5 has a pair of generally vertically extending legs 11 An upper portion 11a of each leg extends along and engages a respective concavely shaped rear edge of the side panels of basket 3. Spaced rivets or like fasteners 12 connect legs 11 to basket 3. A lower portion 11b of each leg extends below basket 3 along rear edge surfaces of lower basket support structure 7, as described in further detail hereinafter. Legs 11 have attached to their respective ends conventional rear wheel assemblies 13. Legs 11 are attached at their upper ends by a cross-arm portion 15 providing a cart handle.

Figure 9:
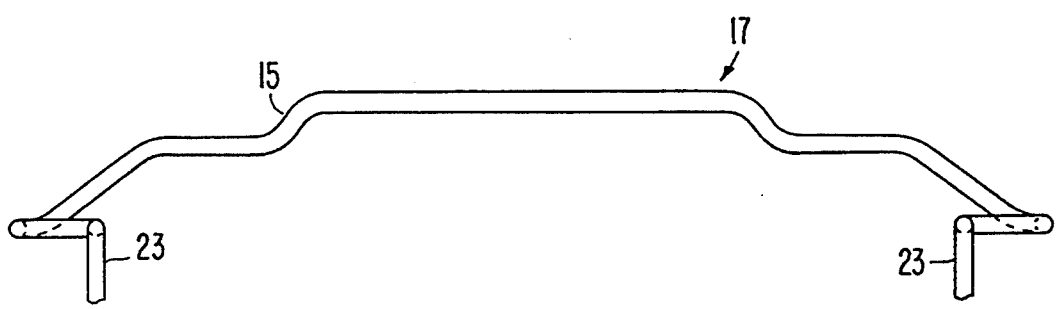
FIG. 9 is a front elevational view of the basket support wire shown in FIG. 8.

A generally U-shaped basket support wire 17 (shown separately in FIGS. 9 and 10) braces basket 3 against the cart handle tube 5, and at the same time lends strength and rigidity to the basket. Support wire 17 has legs 19 that extend within respective upwardly opening channels 21 provided along opposing side segments of upper peripheral edge portion 9. Preferably, channels 21 extend along less than half of the entire lengths of the opposing side segments. Support wire legs 19 are preferably snap-fittingly engaged in channels 21 which may be configured in the manner described in the inventor's U.S. Pat. No. 4,865,338, which is hereby incorporated by reference. Bent end portions 23 of legs 19 extend downwardly into corresponding openings 25 provided in peripheral edge portion 9 to anchor support wire 17 to basket 3, and thereby prevent longitudinal movement of legs 19 within channel 21.

A cross-arm portion 27 connects legs 19 and wraps around legs 11 of cart handle tube 5 to secure basket support wire 17 to cart handle tube 5. Cross-arm portion 27 may serve as a hinge wire for a conventional swingable rear gate panel (not shown) of basket 3. The swingable rear gate may have attached thereto a collapsible child seat of known construction.

Lower basket support structure 7 comprises a generally horizontally extending base member 29 and an upstanding pedestal structure 31 rising from a rearward portion of base member 29 and providing an elevated basket mounting portion 33. Preferably, base member 29 and pedestal structure 31 are integrally molded as one piece of plastic material, with a plurality of strengthening ribs, e.g., 35. Upstanding pedestal structure 31 comprises a pair of forward struts 37 and a pair of rearward struts 39. The front and rear struts support and are connected by basket mounting portion 33. As best seen in FIG. 6, mounting portion 33 provides a perimetric support shoulder 41 on which a rear portion of the bottom panel of basket 3 rests. Integrally molded plastic spring clip members 43 are provided along opposite sides of mounting portion 33 and engage corresponding shoulders provided on basket 3. Mounting portion 33 also comprises forward and rearward auxiliary locking hooks 45, 47 for engaging corresponding hooks or shoulders provided on basket 3. This mounting arrangement is of the general type disclosed in the inventor's U.S. Pat. No. 4,746,134, which is hereby incorporated by reference.

Base member 29 comprises a pair of longitudinally extending side beams 49 and a wrap-around front portion 50 (see, e.g., FIG. 3). Rear edge surfaces of rear struts 39 are concavely shaped to provide channels 51 (see FIG. 6) for receiving lower handle tube leg portions 11b therein. Continuation channels 53 of channels 51 are provided along rear edge surfaces of side beams 49. Cart handle tube legs 11 are secured to lower basket support structure 7 by rivets or like fasteners 54 extending into channels 51, similar to the way in which legs 11 are secured to the basket side panel rear edge surfaces. A bar (not shown) may be welded in place to span the distance between legs 11 adjacent the lower ends thereof, to lend extra rigidity to the structure.

Figure 10:
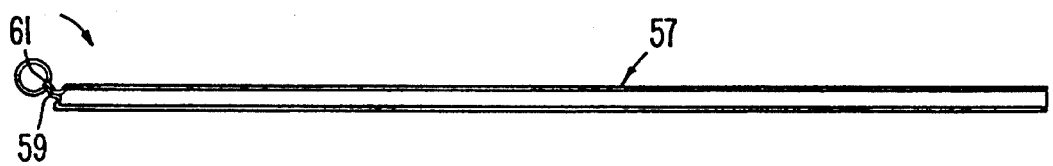
FIG. 10 is a bottom plan view of a reinforcing rail of the lower basket support structure, showing the relationship of the rail to a cart handle tube leg.
Figure 11:
FIG. 11 is a side elevation view of the reinforcing rail shown in FIG. 10.
Figure 12:
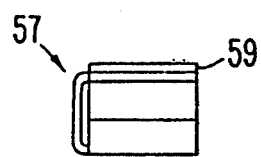
FIG. 12 is an end elevational view of the reinforcing rail shown in FIG. 10.

Side beams 49 are U-shaped in cross section and define downwardly opening channels 55. Received in each channel 55 is a reinforcing rail 57 (see, e.g., FIG. 3). As best seen in FIGS. 10–12, reinforcing rail 57 is preferably formed as a metal strip bent into a U-shape. Rail 57 has a reduced width end portion 59 which is crimped to provide a tongue member which is engageable in a slot 61 provided in lower leg portion 11b. The tongue member formed by end portion 59 has a bent configuration which allows it to be inserted into slot 61 then rotated to a position against the inside of tube 11, whereupon reinforcing rail 57 is locked to tube 11. Alternatively, the reinforcing rails may be welded to the cart tube legs. However, the illustrated arrangement is preferred so as to allow shipment of the cart in a knocked down state and assembly at the point of use.

Figure 13:
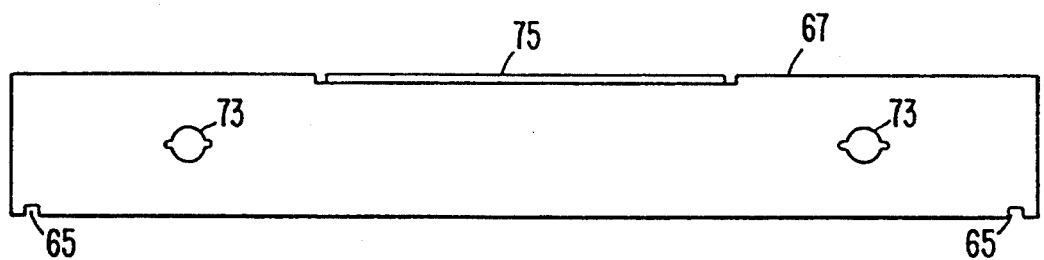
FIG. 13 is a bottom plan view of a front caster plate of the lower basket support.
Figure 14:
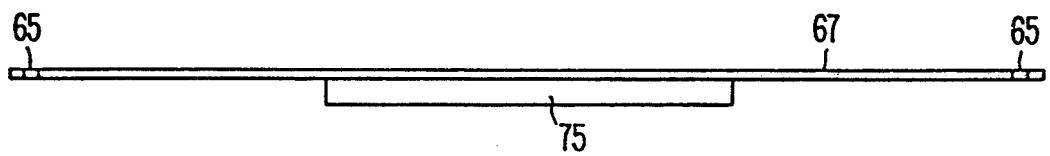
FIG. 14 is a side elevational view of the front caster plate shown in FIG. 13.
Figure 15:
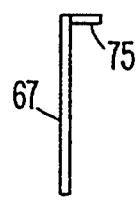
FIG. 15 is an end elevational view of the front caster plate shown in FIG. 13.

The forward end of each reinforcing rail has a slot 63 which receives a notched end 65 of a front wheel assembly mounting plate 67 (see FIGS. 13-15). Mounting plate 67 is housed within a channel 69 provided in wrap-around portion 51 (see FIG. 3). A pair of front wheel assemblies 71 (see FIG. 1—only one visible) are attached by bolts or other known means to plate 67 at mounting locations 73. An upstanding tongue 75 of plate 67 extends into a corresponding slot 77 provided along a forward edge of channel 69.

From the above description, it should be apparent that a cart in accordance with the present invention may be shipped in a knocked down state, i.e., with basket 3, cart tube 11, lower basket support structure 7 and wheel assemblies 13 and 71 disassembled from each other. It is then a simple matter for the cart to be assembled at the point of use. To assemble the cart, end portions 59 of rails 57 are inserted into slots 61 of cart tube legs 11 and rotated to respective positions where the notched ends 65 of caster plate 67 can enter slots 63. When rails 57 have reached these respective positions, the rails will be locked onto the cart tubes due to the configuration of crimped rail end portions 59. Next, base member 29 may be positioned over the reinforcing frame created by rails 57 and front wheel assembly mounting plate 67. Then, handle tube legs 11 are positioned and secured in channels 51 and 53. Basket 3 may be snapped into place on mounting portion 33 either before or after lower basket support structure 7 is placed over the reinforcing frame formed by reinforcing rails 57 and front wheel assembly mounting plate 67. During this step, the cart handle tube legs are positioned and secured in the concave channels provided along the rear edges of the basket side panels. Basket support wire 17 may then be properly positioned around cart handle tube legs 11, and support wire legs 19 may be snapped into channels 21 with bent end portions 23 anchored in openings 25. Brackets 26 are then snapped onto edge portion 9, over legs 19. Finally, front wheel assemblies 71 may be mounted to mounting plate 67, and rear wheel assemblies 13 may be mounted to the ends of cart handle tube legs 11. Obviously, other orders of assembly may be utilized.

The present invention has been described in terms of preferred embodiments thereof. Other embodiments within the scope and spirit of the invention as defined in the appended claims will, given the benefit of this disclosure, occur to those having ordinary skill in the art. Furthermore, although the invention is expressed in the claims in terms of completed assemblies or sub-assemblies, it will be understood that these claims are intended to cover directly corresponding structure packaged in a knocked down state and capable of assembly in the recited manner.

I claim:

1. A cart comprising:
    a basket having a molded plastic upper peripheral edge portion;
    a cart handle tube having generally vertically extending legs engaging said basket, and a cross-arm portion connecting said legs and providing a cart handle;
    a basket support wire having legs extending along and secured to respective side segments of said upper peripheral edge portion, along less than the respective lengths of said side segments, and a cross-arm portion connecting said legs and engaging said cart handle tube, said support wire legs having bent end portions which extend downwardly and are anchored in respective openings provided in said peripheral edge portion; and
    a basket support structure attached to an underside of said basket.

2. A cart according to claim 1, wherein said legs of the basket support wire extend along less than one half of the respective lengths of said side segments of the upper peripheral edge portion.

3. A cart according to claim 1, wherein said side segments of said upper peripheral edge portion include slots for retaining respective basket support wire legs therein.

4. A cart according to claim 3, wherein said support wire legs are snap-fittingly retained in said slots.

5. A cart according to claim 1, wherein said basket comprises three upstanding generally open lattice-work side panels integrally molded with said upper peripheral edge portion, and said basket support structure comprises a molded plastic support base.

6. A cart comprising:
    a basket having a molded plastic upper peripheral edge portion;
    a cart handle tube having generally vertically extending legs engaging said basket, and a cross-arm portion connected between said legs and providing a cart handle;
    a basket support wire having legs extending along said upper peripheral edge portion and having end portions anchored thereto, and a cross-arm portion engaging said cart handle tube, said support wire legs having bent end portions which extend downwardly and are anchored in respective openings provided in said peripheral edge portion; and
    a basket support structure attached to an underside of said basket.

7. A cart according to claim 6, wherein said openings are provided in respective opposed sides of said upper peripheral edge portion.

8. A cart according to claim 6, wherein said basket support wire leg members are snap-fittingly retained in slots provided in said upper peripheral edge portion.

9. A cart according to claim 6, wherein said basket comprises three upstanding generally open lattice-work panels integrally molded with said upper peripheral edge portion, and said basket support structure comprises a molded plastic support base.

10. A cart according to claim 6, wherein:
    said basket support member is formed of molded plastic and has a generally horizontally extending base member, and an upstanding pedestal structure rising from a rearward portion of said base member and providing an elevated basket mounting portion; and
    lower portions of said handle tube legs extend along a rearward side of said pedestal structure and have end portions adjacent a rearward edge of said base member to which respective rear wheel assemblies are mounted.

11. A cart according to claim 10, wherein said base member comprises two interconnected side beams, and received within each said side beam is a reinforcing rail having a rear end thereof coupled to a respective one of said handle tube legs.

12. A cart according to claim 11, wherein the rear end of each reinforcing rail is engaged with a slot provided in a respective end portion of said handle tube legs.

13. A cart according to claim 12, wherein each reinforcing rail comprises a metal tube having a crimped rear end portion lockingly engaged with said slot.

14. A cart according to claim 11, wherein said mounting portion comprises a plastic molded spring clip member and said basket comprises a shoulder with which said spring clip member is lockingly engaged.

15. A cart according to claim 10, wherein said pedestal comprises a pair of rear struts and a pair of front struts, said pairs of struts being interconnected at an upper end of said pedestal by said mounting portion.

16. A cart according to claim 15, wherein said rear struts have arcuate channel-forming rear edge surfaces along which respective handle tube leg lower portions extend.

17. A cart according to claim 16, wherein a rear edge surface of said base member has continuations of said channel-forming rear edge surfaces, along which said respective handle tube leg lower portions extend.

18. A cart chassis for supporting a cart basket, comprising:
   a cart handle tube having generally vertically extending legs and a cross-arm portion connected between said legs for providing a cart handle, said vertically extending legs having respective upper portions for extending along and engaging a cart basket, and respective lower portions for extending below said cart basket; and
   a molded plastic basket support member having a generally horizontally extending base member, and an upstanding pedestal structure rising from a rearward portion of said base member and providing an elevated basket mounting portion, said lower portions of said handle tube legs extending along a rearward side of said pedestal structure and having end portions adjacent a rearward edge of said base member for providing rear wheel assembly mounting locations.

19. A cart chassis according to claim 18, wherein said base member comprises two interconnected side beams, and received within each said side beam is a reinforcing rail having a rear end thereof coupled to a respective one of said handle tube legs.

20. A cart chassis according to claim 19, wherein the rear end of each reinforcing rail is engaged with a slot provided in a respective end portion of said handle tube legs.

21. A cart chassis according to claim 20, wherein each reinforcing rail comprises a metal tube having a crimped rear end portion lockingly engaging said slot.

22. A cart chassis according to claim 20, wherein extending between and secured to said reinforcing rails, adjacent a front end of said base member, is a front wheel assembly mounting plate.

23. A cart chassis according to claim 22, wherein said mounting plate has end portions adapted to be engaged with slots provided in said reinforcing rails.

24. A cart chassis according to claim 22, wherein said mounting plate is received within a wrap-around front portion of said base member, connecting said side beams.

25. A cart chassis according to claim 18, wherein said mounting portion comprises a plastic molded spring clip member for engaging a corresponding shoulder provided on said cart basket.

26. A cart chassis according to claim 18, wherein said pedestal comprises a pair of rear struts and a pair of front struts, said pairs of struts being interconnected at an upper end of said pedestal by said mounting portion.

27. A cart chassis according to claim 26, wherein said rear struts have arcuate channel-forming rear edge surfaces along which said respective handle tube leg lower portions extend.

28. A cart according to claim 27, wherein said rearward edge of said base member has continuations of said channel-forming rear edge surfaces, along which said respective handle tube leg lower portions extend.

* * * * *